(12) United States Patent
Shoji et al.

(10) Patent No.: US 9,839,070 B1
(45) Date of Patent: Dec. 5, 2017

(54) WIRELESS COMMUNICATION SYSTEM FOR GENERATING ADAPTIVE ADDRESS CODES IN AN AD HOC NETWORK

(71) Applicant: HITACHI KOKUSAI ELECTRIC INC., Tokyo (JP)

(72) Inventors: Tomoya Shoji, Tokyo (JP); Nobuyuki Uchikawa, Tokyo (JP); Hiroshi Nakano, Tokyo (JP); Junichi Shiraishi, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/532,519

(22) PCT Filed: Dec. 2, 2015

(86) PCT No.: PCT/JP2015/083857
§ 371 (c)(1),
(2) Date: Jun. 2, 2017

(87) PCT Pub. No.: WO2016/088792
PCT Pub. Date: Jun. 9, 2016

(30) Foreign Application Priority Data

Dec. 3, 2014 (JP) .................................. 2014-244896

(51) Int. Cl.
*H04W 84/18* (2009.01)
*H04W 40/04* (2009.01)
(Continued)

(52) U.S. Cl.
CPC ............. *H04W 84/18* (2013.01); *H04W 8/26* (2013.01); *H04W 40/04* (2013.01); *H04W 88/04* (2013.01)

(58) Field of Classification Search
CPC ........ H04W 8/26; H04W 40/04; H04W 84/18
See application file for complete search history.

(56) References Cited

U.S. PATENT DOCUMENTS 6,798,770 B1 * 9/2004 Hollatz ............... H04M 7/1245
370/353
2001/0054101 A1 * 12/2001 Wilson .................... H04L 12/14
709/225

(Continued)

FOREIGN PATENT DOCUMENTS

| JP | 2007-532058 A | | 11/2007 |
| JP | 2013031113 A | * | 2/2013 |
| JP | 2014-068188 A | | 4/2014 |

OTHER PUBLICATIONS

Machine translation of JP 201331113 (generated by ProQuest).*
Machine translation of JP 201331113 (generated by Espacenet).*
International Search Report dated Feb. 2, 2016.

*Primary Examiner* — Devan Sandiford
(74) *Attorney, Agent, or Firm* — Bacon & Thomas, PLLC (57) ABSTRACT

In a wireless communication system, a plurality of communication devices performs transmission and reception, each communication device including a signal processing unit/transmitting unit, a MAC layer processing unit and an IP layer processing unit. The IP layer processing unit includes an ad hoc network processing unit, an address information management unit, a relay information storage unit and an ARP information storage unit. The ARP information storage unit stores an adaptive address code information table and the relay information storage unit stores a relay information table.

4 Claims, 13 Drawing Sheets

EXPLANATION VIEW WHEN ESTABLISHING AD HOC NETWORK (51) Int. Cl.
 *H04W 8/26* (2009.01)
 *H04W 88/04* (2009.01)

(56) References Cited

U.S. PATENT DOCUMENTS

| | | | |
|---|---|---|---|
| 2003/0072298 A1* | 4/2003 | Slobodin | H04L 12/1818 370/352 |
| 2004/0109452 A1* | 6/2004 | Takihiro | H04L 12/1854 370/392 |
| 2004/0141511 A1* | 7/2004 | Rune | H04L 45/20 370/401 |
| 2004/0151193 A1* | 8/2004 | Rune | H04L 29/06 370/401 |
| 2004/0153520 A1* | 8/2004 | Rune | H04L 12/4616 709/206 |
| 2004/0156318 A1* | 8/2004 | Rune | H04W 92/02 370/235 |
| 2004/0156384 A1* | 8/2004 | Rune | H04W 40/02 370/432 |
| 2004/0167988 A1* | 8/2004 | Rune | H04L 12/4616 709/238 |
| 2007/0286097 A1* | 12/2007 | Davies | H04L 45/02 370/255 |
| 2008/0137580 A1 | 6/2008 | Axelsson et al. | |
| 2009/0046730 A1* | 2/2009 | Shimomura | H04L 45/00 370/401 |
| 2009/0129301 A1* | 5/2009 | Belimpasakis | H04W 28/18 370/310 |
| 2017/0026387 A1* | 1/2017 | Vissamsetty | H04L 63/1408 |

\* cited by examiner

COMMUNICATION DEVICE A
ADAPTIVE ADDRESS CODE INFORMATION TABLE

| NO. | ADDDRESS CODE | PARTICIPATION NUMBER | RESPONSE NUMBER | IP ADDRESS #1 | IP ADDRESS #2 |
|---|---|---|---|---|---|
| 1 | 0x0102 | 2 | 1 | 192.168.10.1 | 192.168.10.2 |
| | | | | | |

FIG.7C

COMMUNICATION DEVICE B
ADAPTIVE ADDRESS CODE INFORMATION TABLE

| NO. | ADDDRESS CODE | PARTICIPATION NUMBER | RESPONSE NUMBER | IP ADDRESS #1 | IP ADDRESS #2 |
|---|---|---|---|---|---|
| 1 | 0x0102 | 2 | 2 | 192.168.10.1 | 192.168.10.2 |
| 2 | 0x0203 | 2 | 1 | 192.168.10.2 | 192.168.10.3 |

FIG.7D

COMMUNICATION DEVICE C
ADAPTIVE ADDRESS CODE INFORMATION TABLE

| NO. | ADDRESS CODE | PARTICIPATION NUMBER | RESPONSE NUMBER | IP ADDRESS #1 | IP ADDRESS #2 |
|---|---|---|---|---|---|
| 1 | 0x0203 | 2 | 2 | 192.168.10.2 | 192.168.10.3 |
| | | | | | |

COMMUNICATION DEVICE A   RELAY INFORMATION TABLE

| NO. | DESTINATION | RELAY | RELAY NUMBER |
|---|---|---|---|
| 1 | COMMUNICATION DEVICE B | NO RELAY | 0 |
| 2 | COMMUNICATION DEVICE C | COMMUNICATION DEVICE B | 1 |
| 3 | TERMINAL #1 | NO RELAY | 0 |
| 4 | TERMINAL #2 | COMMUNICATION DEVICE B | 2 |

FIG.9C

COMMUNICATION DEVICE B   RELAY INFORMATION TABLE

| NO. | DESTINATION | RELAY | RELAY NUMBER |
|---|---|---|---|
| 1 | COMMUNICATION DEVICE A | NO RELAY | 0 |
| 2 | COMMUNICATION DEVICE C | NO RELAY | 0 |
| 3 | TERMINAL #1 | COMMUNICATION DEVICE A | 1 |
| 4 | TERMINAL #2 | COMMUNICATION DEVICE C | 1 |

FIG.9D

COMMUNICATION DEVICE C   RELAY INFORMATION TABLE

| NO. | DESTINATION | RELAY | RELAY NUMBER |
|---|---|---|---|
| 1 | COMMUNICATION DEVICE A | COMMUNICATION DEVICE B | 1 |
| 2 | COMMUNICATION DEVICE B | NO RELAY | 0 |
| 3 | TERMINAL #1 | COMMUNICATION DEVICE A | 2 |
| 4 | TERMINAL #2 | NO RELAY | 0 |

FIG.10A

WIRELESS COMMUNICATION SYSTEM FOR GENERATING ADAPTIVE ADDRESS CODES IN AN AD HOC NETWORK

FIELD OF THE INVENTION

The present invention relates to a wireless communication system.

BACKGROUND OF THE INVENTION

Figure 1:
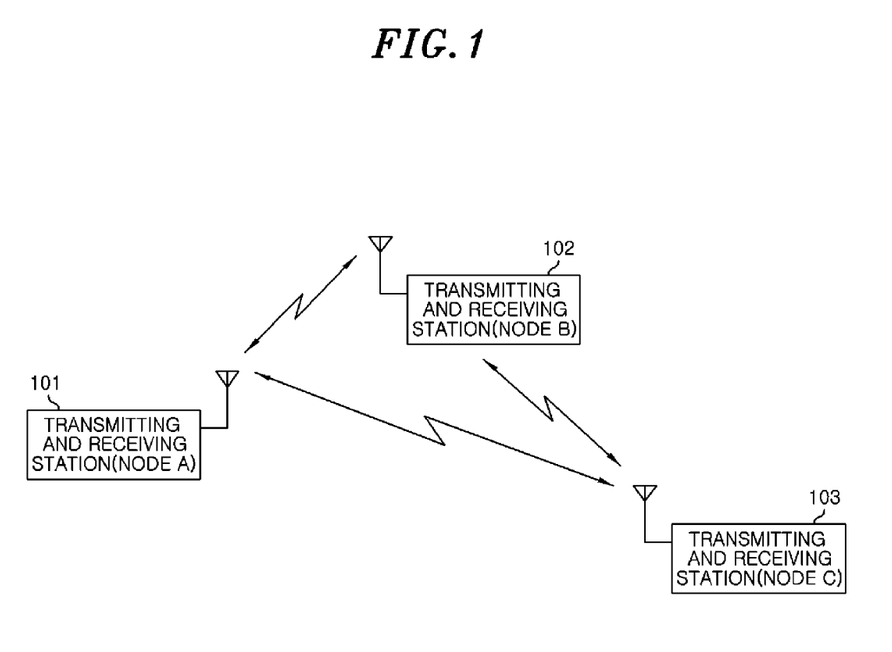
FIG. 1 is a view showing a concept of a wireless communication system.

A wireless communication system has a configuration shown in, e.g., FIG. 1. In the wireless communication system, transmitting and receiving stations 101, 102 and 103 move to build a particular network (an ad hoc network) and share information even though a base station (not shown) or an access point is not present. In the ad hoc network, in response to the travel of the transmitting and receiving stations 101, 102 and 103, the communication is always maintained by determining a communication target and relay status in accordance with the traveled position and the line status.

Figure 2:
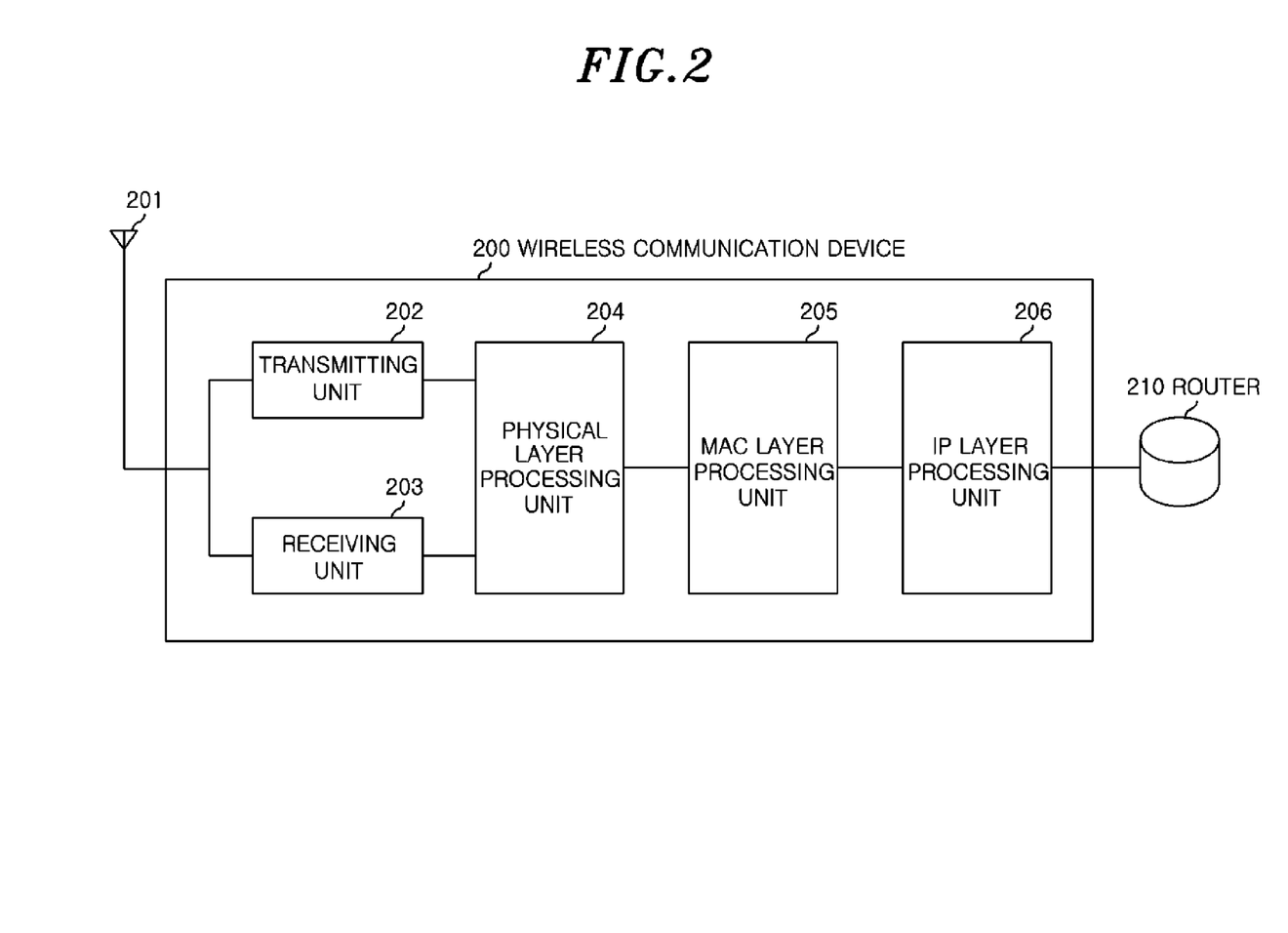
FIG. 2 is a view showing a schematic configuration of a wireless communication device.

FIG. 2 is a view showing a schematic configuration of a wireless communication device of the transmitting and receiving stations 101, 102 and 103. In FIG. 2, a wireless communication device 200 of the transmitting and receiving stations 101, 102 and 103 includes an antenna 201, a transmitting unit 202, a receiving unit 203, a physical layer processing unit 204, MAC (Media Access Control) layer processing unit 205 and IP (Internet Protocol) layer processing unit 206. The wireless communication device 200 is electrically connected to a router 210.

As for the flow of transmission data, the wireless communication device 200 performs the relay of the transmission data outputted from a terminal such as a PC (Personal Computer). An IP packet outputted from the router 210 is inputted to the wireless communication device 200 and routed in the IP layer processing unit 206. In a case where the IP packet is routed to another transmitting and receiving station, a MAC frame is generated from the IP packet in the MAC layer processing unit 205. At the same time, in the MAC layer processing unit 205, a wireless channel is obtained by an autonomous distributed control. When the wireless channel is obtained, the wireless communication device 200 modulates the MAC frame information in the physical layer processing unit 204, and transmits the modulated information from the transmitting unit 202 through the antenna 201.

As for the flow of reception data, a signal received by the receiving unit 203 through the antenna 201 is demodulated in the physical layer processing unit 204 and then inputted to the MAC layer processing unit 205 as the MAC frame information. The MAC layer processing unit 205 checks a destination address and a frame error and confirms whether or not it is in a response order of itself. If the response is in its own response order, the MAC layer processing unit 205 generates a response frame for a previously received MAC frame to send the response frame as a reply. At the same time, the MAC layer processing unit 205 delivers an IP packet to the IP layer processing unit 206. The IP layer processing unit 206 determines whether to discard the data or output the data to the router 210 based on the routing information.

Figure 3:
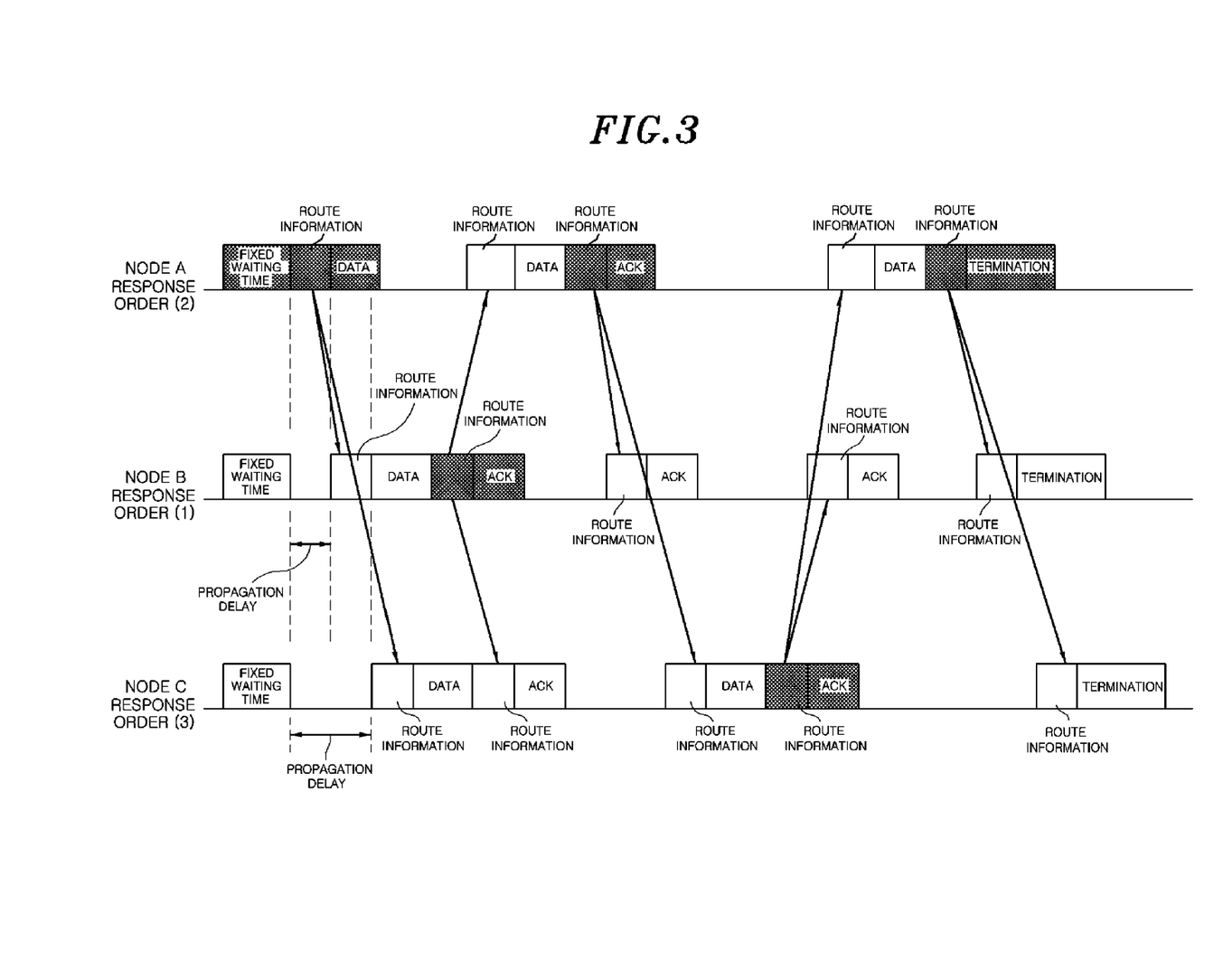
FIG. 3 is a timing chart for explaining an operation of the wireless communication system.

FIG. 3 is a timing chart for explaining an operation of the wireless communication system. In FIG. 3, a propagation delay rate is set to be almost the same as a symbol rate and the number of the transmitting and receiving stations (nodes) is three. An address code is previously set. The address code is set as address code information in the IP layer processing unit 206 and the MAC layer processing unit 205 of the wireless communication device 200. In the set address code information, while using the address code as a key, the number of subscriber stations and a response number are stored as a pre-assignment table.

Nodes 'A', 'B' and 'C' have a previously determined response order when a response is requested. In FIG. 3, a response order (1) is the highest in priority and a response order (3) is the lowest. In the same communication system, different nodes do not have the same response order. FIG. 3 shows a case where the transmission of route information and data is started after a carrier sense is performed from the node 'A' (after a fixed waiting time).

When the "route information and data (data representing information of voice, image and the like)" is transmitted from the node 'A', each receivable node performs reception of the "route information and data" transmitted by the node 'A'. Here, the reply of another node is available when the reception of the "route information and data" is completed at the corresponding node. Among the nodes performing the reception of the "route information and data", first, if the node 'B' having the response order (1) completes the reception of the "route information and data", the node 'B' sends a "route information and ACK" as a reply. Among the nodes which have received the "route information and ACK" of the node 'B' and have lower response orders than that of the node 'B', one having the highest response order, i.e., the node 'A' having the order next to that of the node 'B', transmits a "route information and ACK". Here, the node 'A' is a transmission source that has transmitted "route information and data" at the beginning. The node 'A' urges other nodes having lower response orders to transmit the "route information and ACK". Although the node 'A' is the transmission source, the node 'A' transmits "route information and ACK" to maintain the route.

In this manner, each node transmits "route information and ACK" when it receives "route information and ACK" of a node having an immediately higher response order. Each station determines whether or not the response order is its own order by judging its own response order from information related to response orders of reception terminals included in the route information of the node 'A' that has transmitted "route information and data" at the beginning, and further, by judging whether the number of received responses counted up by a communication control unit or information representing response order of the transmission source including ACK corresponds to its own response order.

When receiving a reply from the node 'C' having the lowest response order, the node 'A' as the transmission source transmits "route information and termination" to notify the termination of the communication. At this time, by checking a response order included in ACK, it is determined whether the transmission has come from a transmitting and receiving station having the lowest priority or whether the number of receptions is equal to the number of subscriber stations (in this case, 3). The above process is the basic operation.

Figure 4:
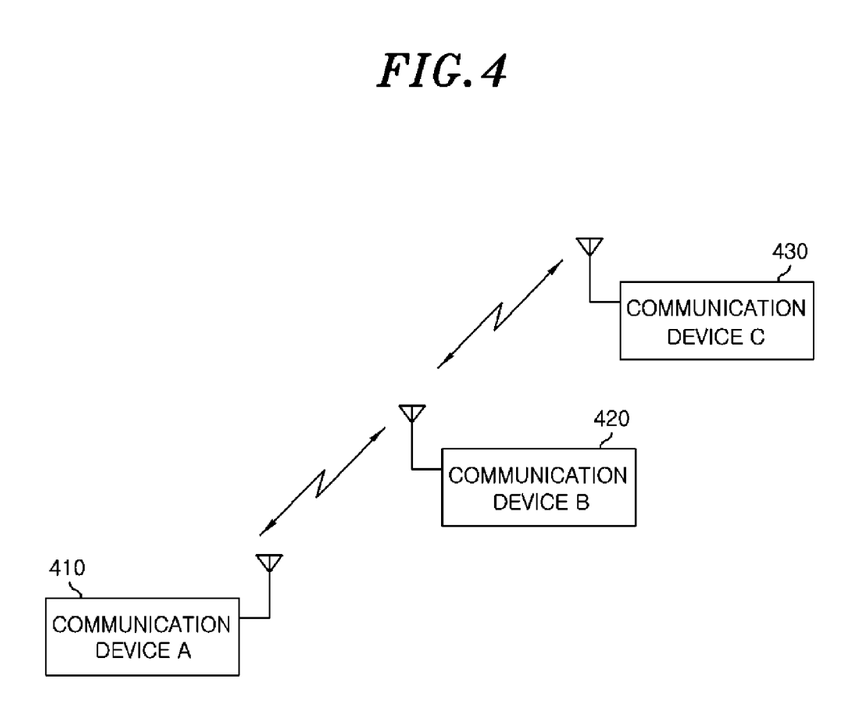
FIG. 4 is a view showing a concept of relay in the wireless communication system.
Figure 5:
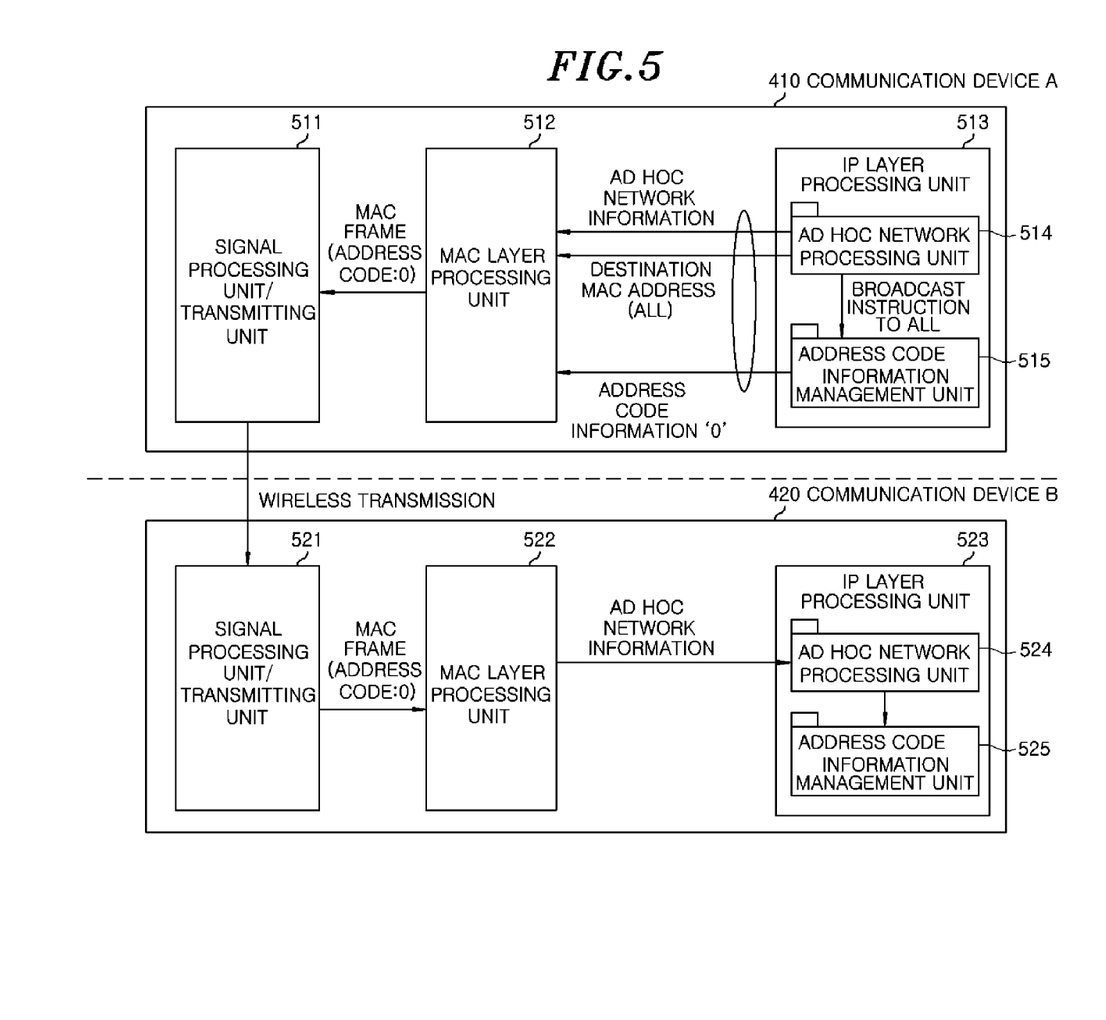
FIG. 5 is a view showing a concept of a case of transmitting ad hoc network information in the wireless communication system in accordance with an embodiment of the present invention.

A pre-assignment method has a constraint condition that the method is applicable to only nodes capable of communicating within 1 hop, i.e., direct communication. That is to say, even if nodes have been registered in a pre-assignment group, for example, as can be seen in FIG. 4, in a case where the nodes 'A' and 'C' cannot perform direct communication and relay is required, the pre-assignment method is not available. The transmission and reply of the nodes 'A' and 'C' do not reach each other.

As a prior art, for example, Patent Document 1 discloses a technique that efficiently specifies the operations of an IP address and a MAC address of a wireless network by an ad hoc routing protocol.

Patent Document 1: Japanese Patent Application Publication No. 2013-110521

In the aforementioned prior art, there are constraints as follows: a pre-assignment communication is available only when the direct communication is possible; and the same address code information is set and kept by a manager or the like in all wireless devices belonging to an ad hoc network. In a case of having the same address code, if the number of subscriber stations and response numbers are different, the communication is not possible.

Moreover, in an ad hoc network where participation and departure of communication subjects are frequent, it is difficult for a manager to maintain the above constraints and to set and manage the most efficient address information while judging whether or not direct communication is possible.

SUMMARY OF THE INVENTION

In view of the above, an object of the present invention is to easily generate address code information with a minimum delay when establishing an ad hoc network.

In accordance with an aspect, there is provided a wireless communication system in which a plurality of communication devices performs transmission and reception, each communication device including a signal processing unit/transmitting unit, a MAC layer processing unit and an IP layer processing unit, wherein the IP layer processing unit includes an ad hoc network processing unit, an address information management unit, a relay information storage unit and an ARP information storage unit, and the ARP information storage unit stores an adaptive address code information table and the relay information storage unit stores a relay information table.

In the wireless communication system, a relay communication device among the plurality of communication devices converts an address code of transmission side to an address code of a transmission destination.

In the wireless communication system, the adaptive address code information table contains an address code, a participation number, a response number and plural IP addresses, and the relay information table contains a destination, a relay device and a relay number.

Effect of the Invention

In accordance with the present invention, when establishing an ad hoc network, it is possible to generate address code information with a minimum delay.

DETAILED DESCRIPTION OF THE EMBODIMENTS

Hereinafter, an embodiment of the present invention will be described with reference to the accompanying drawings.

FIG. 4 is a view showing a concept of relay in a wireless communication system. In FIG. 4, a communication device 'A' 410 cannot directly communicate with a communication device 'C' 430, but communicates with the communication device 'C' 430 through the relay of a communication device 'B' 420. First, the communication device 'A' 410 exchanges ad hoc network information with the communication device 'B' 420. At the same time, the communication device 'C' 430 exchanges the ad hoc network information with the communication device 'B' 420. Since a message needs to be broadcasted to all, the IP layer processing unit 206 instructs the MAC layer processing unit 205 at a code that does not require ACK communication, e.g., an address code '0' and performs a wireless transmission.

In the above, if information has been successfully exchanged, it becomes possible that the communication device 'A' 410 communicates with the communication device 'C' 430 through the relay of the communication device 'B' 420. At this time, since the communication device 'A' 410, communication device 'C' 430, and communication device 'B' 420 come to join to the same network, as shown in FIG. 6, they have unique IP addresses within the same network.

Figure 6:
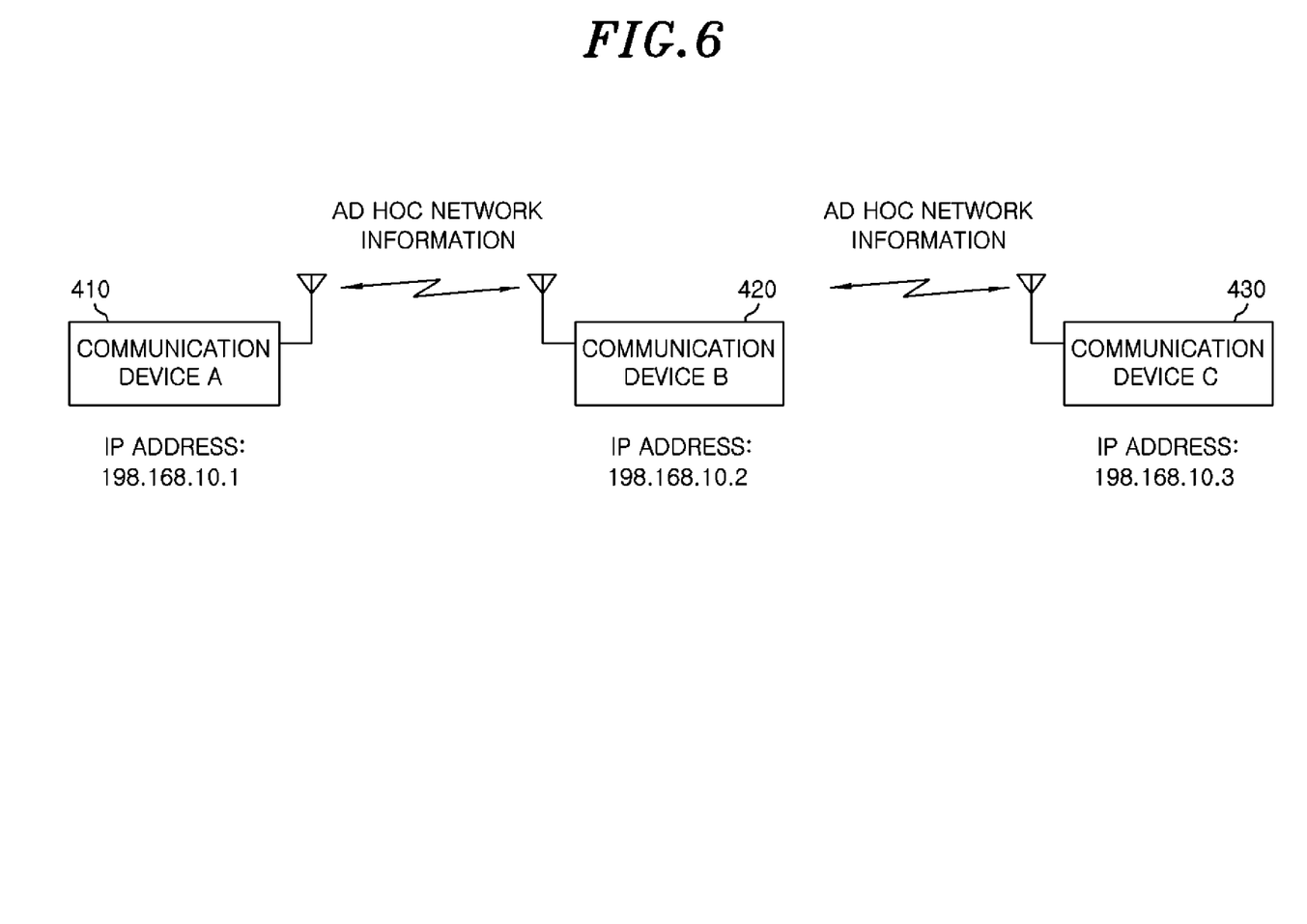
FIG. 6 is a view for explaining an IP address when establishing an ad hoc network in the wireless communication system.
Figure 7A:
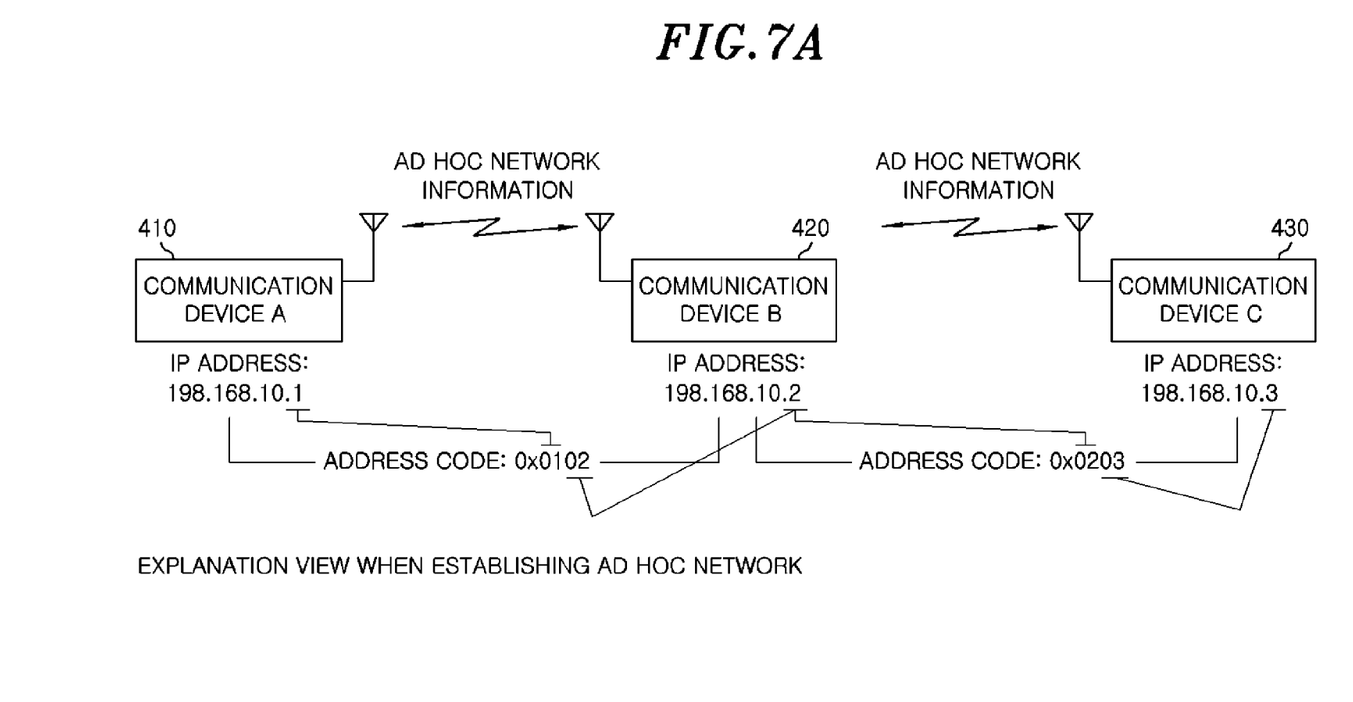
FIGS. 7A to 7D are views for explaining adaptive address code information when establishing the ad hoc network in the wireless communication system in accordance with the embodiment of the present invention.
Figure 7B:
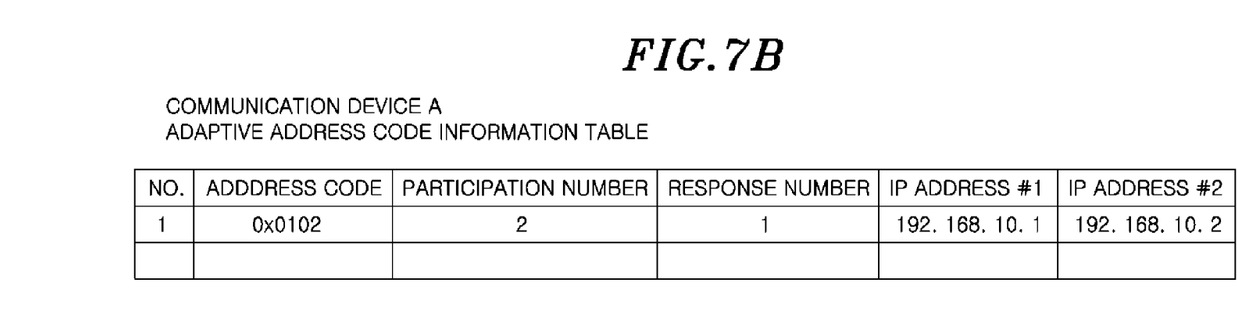
Figure 7C:
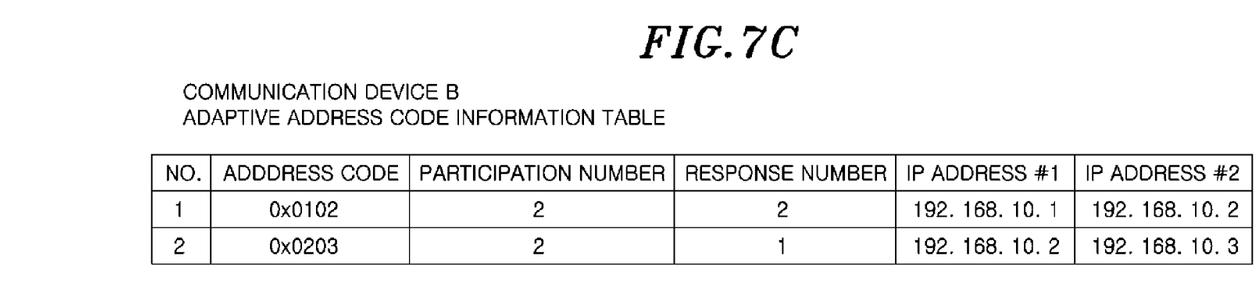
Figure 7D:
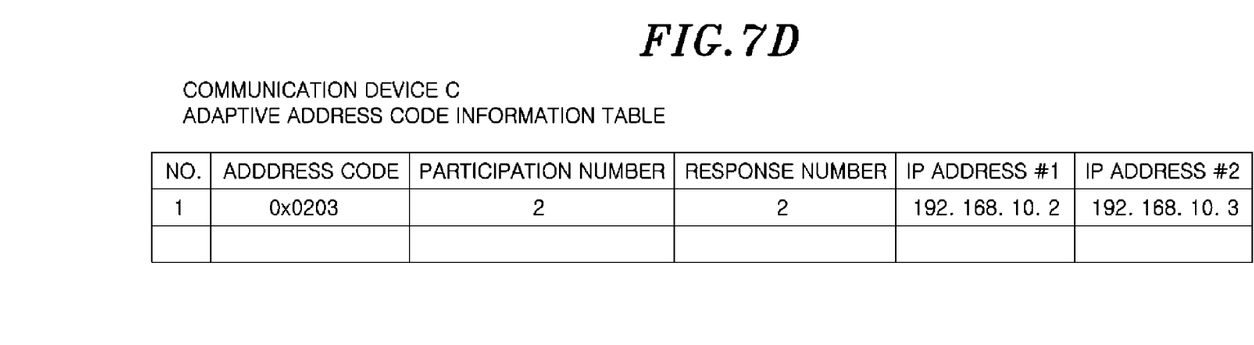

FIG. 6 is a view for explaining an IP address when establishing an ad hoc network in the wireless communication system. As to the IP address, the IP layer processing unit 206 determines an address code by, e.g., the combination of final numbers. The address codes generated by combining unique IP addresses become also unique on the ad hoc network. Here, a participation number of the generated address codes are set to 2 and a response order is determined by ascending order of IP addresses. This information is defined as adaptive address code information. The adaptive address code is also set in the MAC processing unit 205.

Figure 8:
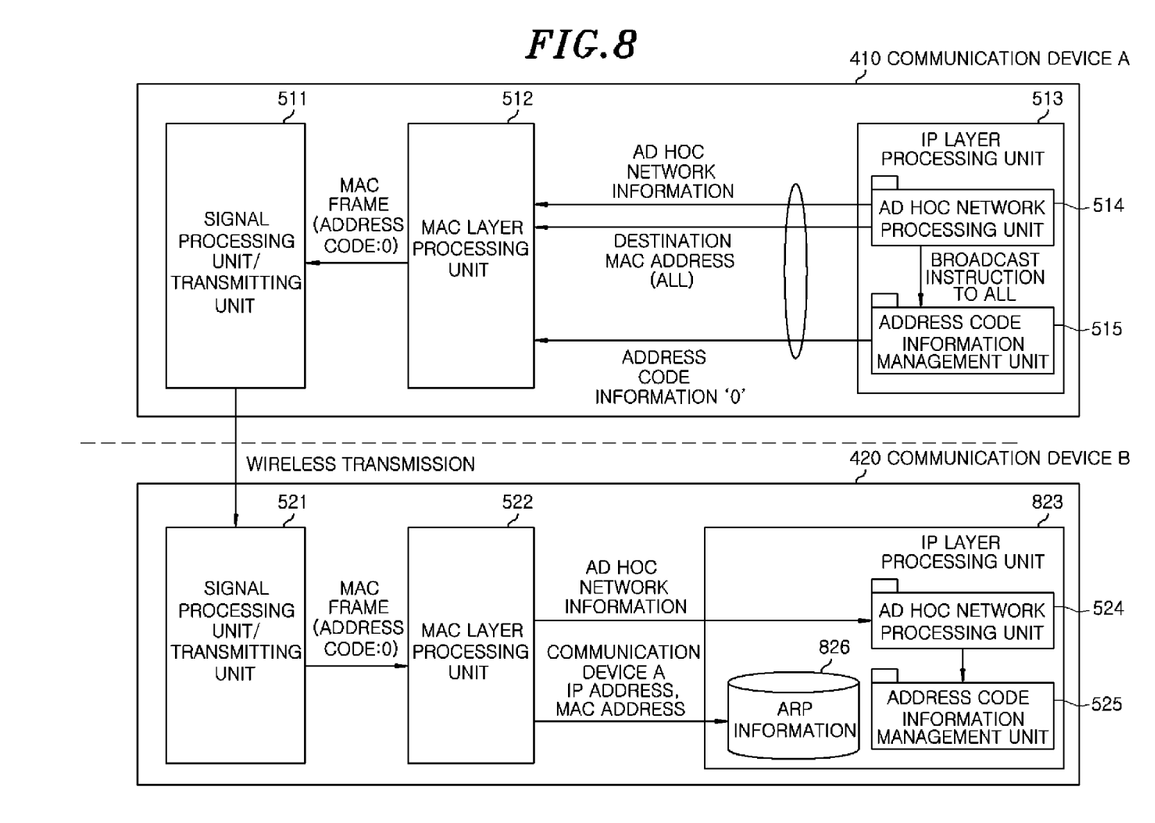
FIG. 8 is a view for explaining an ARP information update when establishing the ad hoc network in the wireless communication system in accordance with the embodiment of the present invention.
Figure 9A:
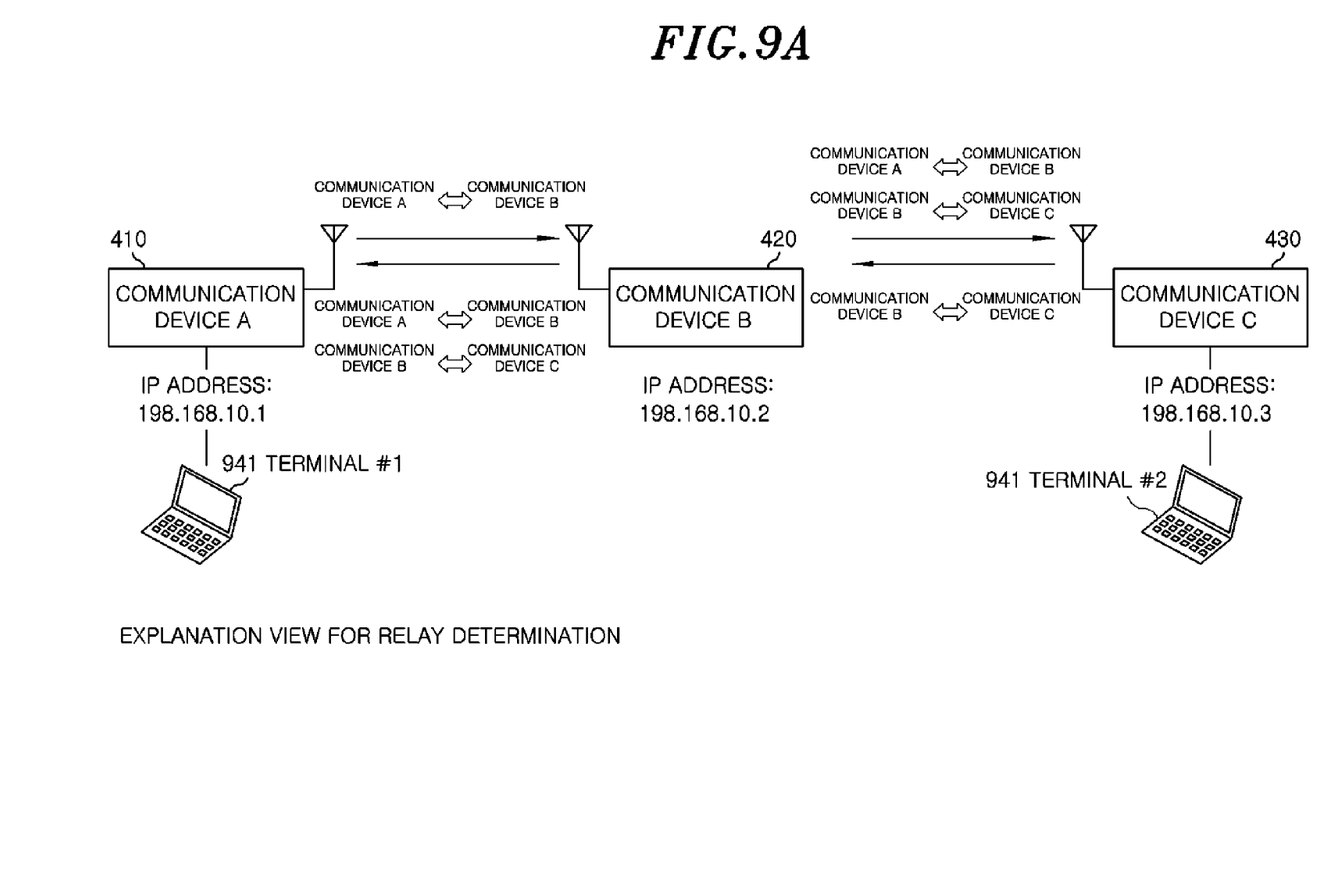
FIGS. 9A to 9D are views for explaining a relay determination when establishing the ad hoc network in the wireless communication system in accordance with the embodiment of the present invention.
Figure 9B:
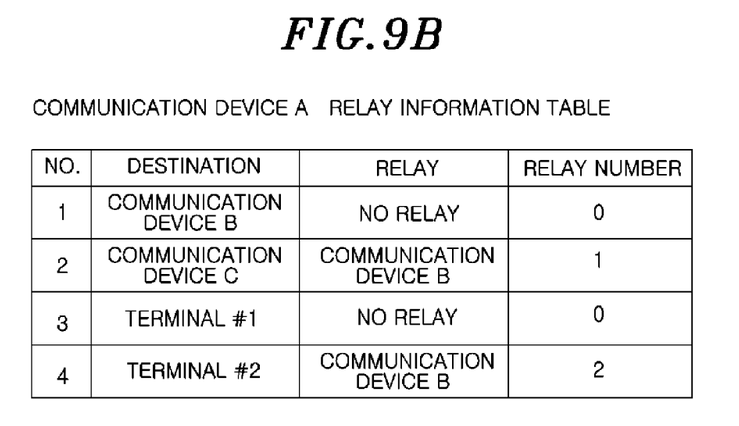
Figure 9C:
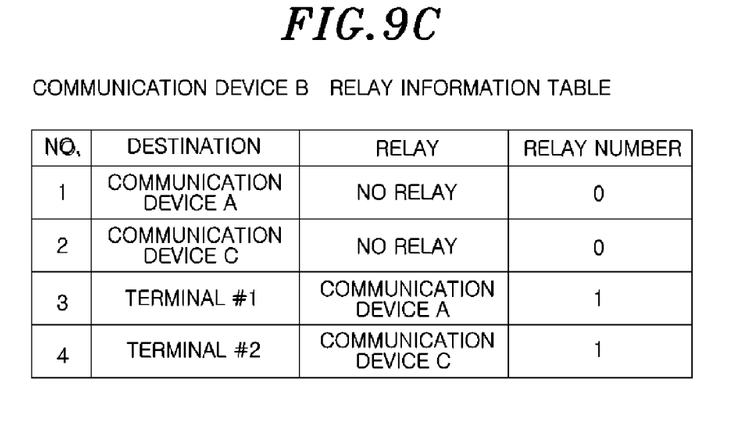
Figure 9D:
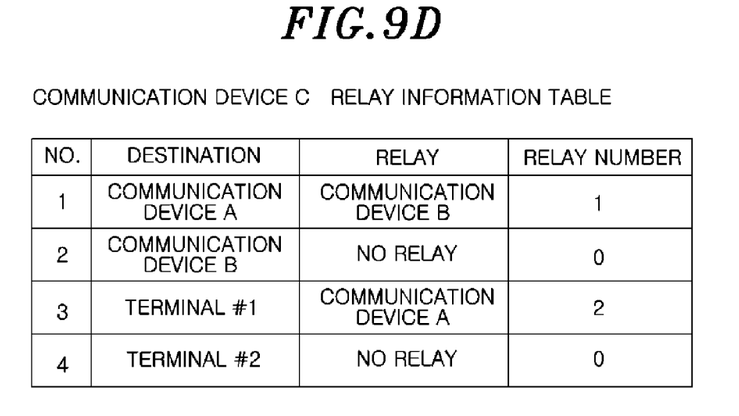

Next, the operation of the wireless communication system in accordance with the embodiment of the present invention will be described with reference to FIGS. 7 and 8. FIGS. 7A to 7D are views for explaining adaptive address code information when establishing the ad hoc network in the wireless communication system in accordance with the embodiment of the present invention. FIG. 8 is a view for explaining an ARP information update when establishing the ad hoc network in the wireless communication system in accordance with the embodiment of the present invention. In FIG. 8, an ARP information storage unit 826 stores adaptive address code information tables of FIGS. 7B to 7D. When IP layer processing units 513 and 823 exchange the ad hoc network information, the exchange is performed by assigning a MAC address and an IP address of the communication device.

By using them, when receiving the ad hoc network information, the IP layer processing units 513 and 823 updates ARP (Address Resolution Protocol) information having combination of the MAC address and the IP address. Up to this point, it is a pre-process to be executed until a terminal such as a PC transmits an IP packet.

Next, a process when an IP packet is inputted from a terminal such as a PC to a communication device will be described. When an IP packet is inputted from a terminal such as a PC to a communication device, the IP layer processing units 513 and 823 in the communication device determines whether or not there is relay transmission from the information exchanged on the ad hoc network. The determination of relay transmission is shown in FIG. 9.

FIGS. 9A to 9D are views for explaining relay determination when establishing the ad hoc network in the wireless communication system in accordance with the embodiment of the present invention. For the relay determination, connection information of a wireless section (hereinafter, referred to as "link information") is used as the content of the ad hoc network information. In this embodiment, since it is known that the communication device 'B' 420 is connected to the communication device 'C' 430 as the destination, the communication device 'A' 410 designates the communication device 'B' 420 as a relay device.

When outputting an IP packet to the MAC layer processing unit, a MAC address of the destination is set in a case that there is no relay device, and in a case that there is a relay device, a MAC address of the relay device is set. At this time, an IP address corresponding to the MAC address is extracted from the ARP information. The extracted IP address and an IP address of its own communication device are used as search keys to extract a matched address code from the adaptive address code information. The address code is given when the IP packet is inputted to the MAC layer processing unit. The MAC layer processing unit generates a MAC frame based on the given address code and the IP packet, outputs the MAC frame to the physical layer processing unit, and performs wireless communication.

Since the communication device as the destination also holds the adaptive address code information, when the communication device as the destination receives the MAC frame, the device determines that the received information is addressed to itself, and transmits ACK to the transmission destination, and then sends the received information to the IP layer processing unit. This case is shown in FIGS. 10A and 10B.

Figure 10A:
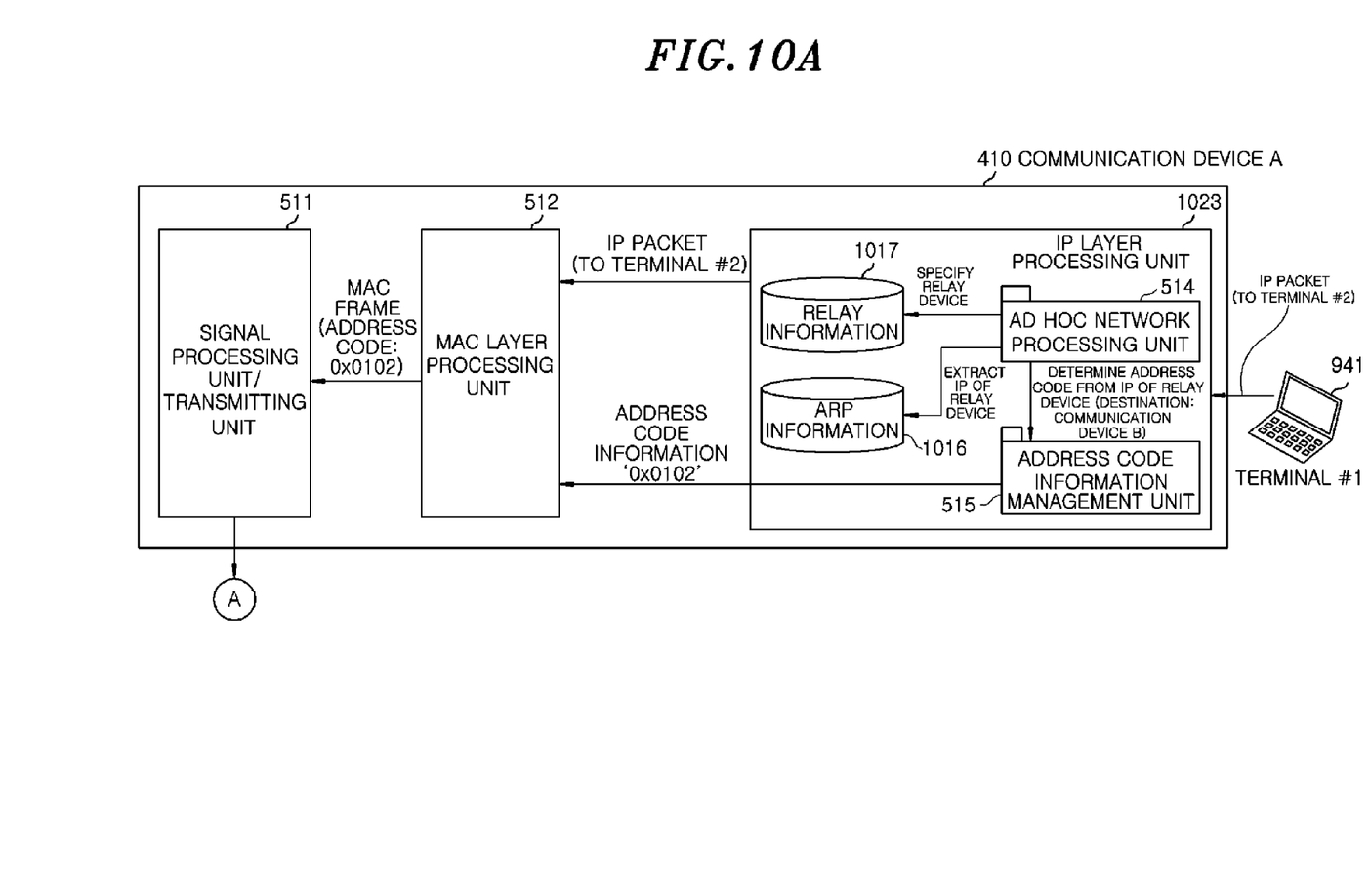
FIGS. 10A and 10B are a view for explaining relay communication using the adaptive address code in the wireless communication system in accordance with the embodiment of the present invention.
Figure 10B:
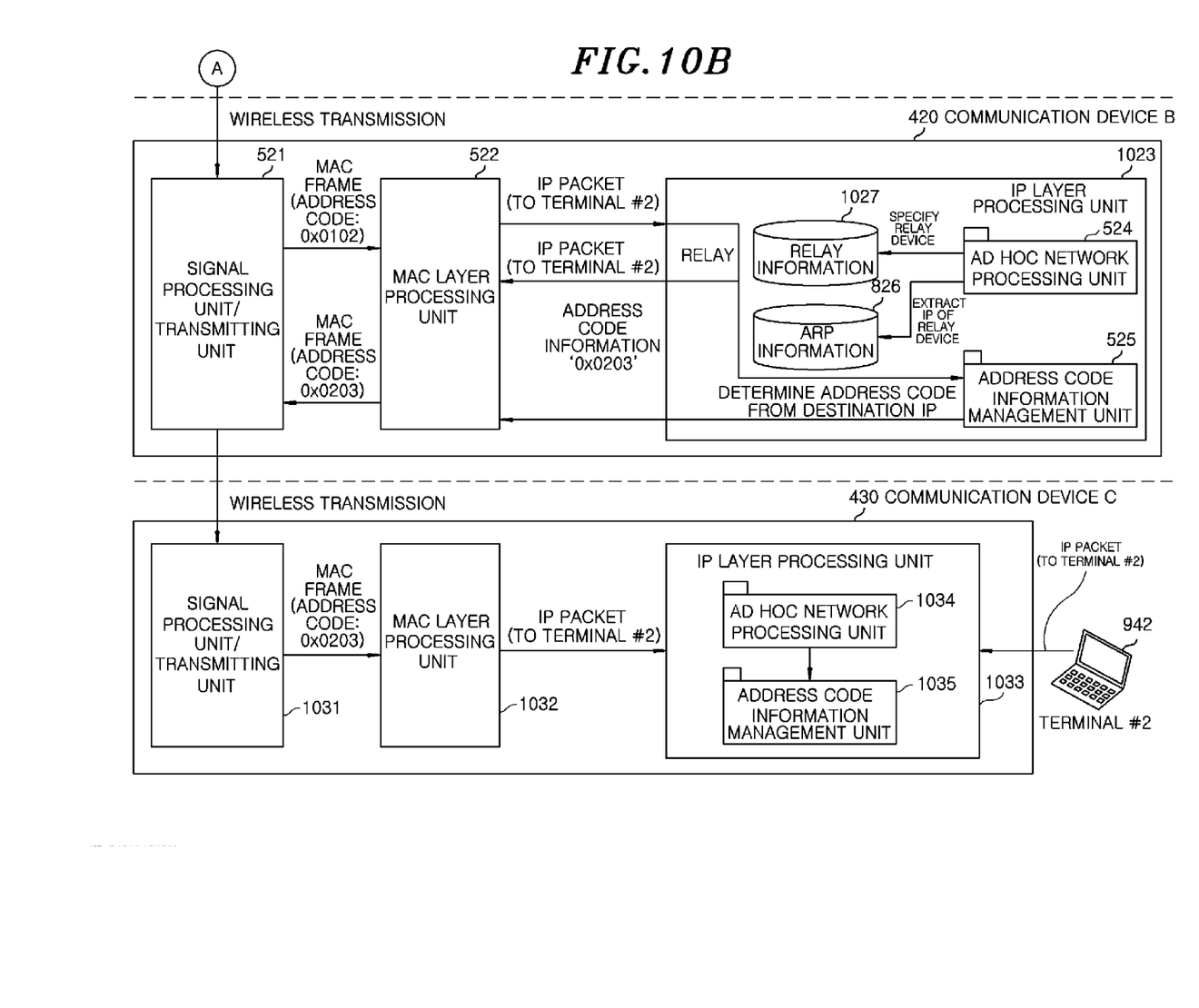

FIGS. 10A and 10B are a view for explaining relay communication using the adaptive address code in the wireless communication system in accordance with the embodiment of the present invention. In FIGS. 10A and 10B, the ARP information storage units 826 and 1016 store the adaptive address code information tables of FIGS. 7B to 7D. Relay information storage units 1017 and 1027 store relay information tables of FIGS. 9B to 9D. The communication device 'A' 410 uses the adaptive address code information shown in FIGS. 7B to 7D and the relay information shown in FIGS. 9B to 9D. From the relay information, it is seen that the communication device 'B' 420 is used as the relay device to send an IP packet to a terminal #2. Therefore, the communication device 'A' 410 selects adaptive address code information (address code "0x0102") constructed between itself and the communication device 'B' 420, outputs the selected information to a MAC layer processing unit 512, and wirelessly transmits a MAC frame.

Upon receiving the wireless information, the communication device 'B' 420 also refers to the adaptive address code information and the relay information, and transmits an IP packet to the communication device 'C' 430 to send data to the terminal #2. At this time, the communication device 'B' 420 selects adaptive address code information (address code "0x0203") constructed between itself and the communication device 'C' 430, outputs the selected information to a MAC layer processing unit 522, and wirelessly transmits a MAC frame. Then, the communication device 'C' 430 receives the wireless information. As described above, optimum address code information is constructed and an address code is selected at the time of communication.

The wireless communication system in accordance with the embodiment of the present invention can generate address code information with a minimum delay when establishing the ad hoc network.

INDUSTRIAL APPLICABILITY

As described above about the present invention in detail, the present invention is useful and available in a wireless communication system. Further, it goes without saying that the present invention is not limited to the wireless communication system described herein but can be widely applied to other wireless communication systems. The present application claims priority based on Japanese Patent Application No. 2014-244896 filed on Dec. 3, 2014, the entire contents of which are incorporated herein by reference.

DESCRIPTION OF REFERENCE NUMERALS 101, 102, 103: transmitting and receiving stations
200: wireless communication device
201: antenna
202: transmitting unit
203: receiving unit
204: physical layer processing unit
205, 512, 522: MAC layer processing unit
206, 513, 523, 1013, 1023, 1033: IP layer processing unit
210: router
410: communication device 'A'
420: communication device 'B'
430: communication device 'C'
511, 521: signal processing unit/transmitting unit
514, 523, 1034: ad hoc network processing unit
515, 525, 1035: address code information management unit
826, 1016: ARP information storage unit
1017, 1027: relay information storage unit

What is claimed is:
1. A wireless communication system in which a plurality of communication devices performs transmission and reception, each communication device including a signal processing unit/transmitting unit, a MAC layer processing unit and an IP layer processing unit, wherein:

the IP layer processing unit includes an ad hoc network processing unit, an address information management unit, a relay information storage unit and an ARP information storage unit, and the ARP information storage unit stores an adaptive address code information table and the relay information storage unit stores a relay information table.

2. The wireless communication system of claim 1, wherein a relay communication device among the plurality of communication devices converts an address code of transmission side to an address code of a transmission destination.

3. The wireless communication system of claim 2, wherein the adaptive address code information table contains an address code, a participation number, a response number and plural IP addresses, and the relay information table contains a destination, a relay device and a relay number.

4. The wireless communication system of claim 1, wherein the adaptive address code information table contains an address code, a participation number, a response number and plural IP addresses, and the relay information table contains a destination, a relay device and a relay number.

\* \* \* \* \*